United States Patent
Tang

(10) Patent No.: US 11,129,056 B2
(45) Date of Patent: Sep. 21, 2021

(54) SYSTEM INFORMATION TRANSMISSION METHOD, BASE STATION, AND TERMINAL

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/097,634

(22) PCT Filed: May 12, 2016

(86) PCT No.: PCT/CN2016/081879
§ 371 (c)(1),
(2) Date: Oct. 30, 2018

(87) PCT Pub. No.: WO2017/193338
PCT Pub. Date: Nov. 16, 2017

(65) Prior Publication Data
US 2019/0141578 A1 May 9, 2019

(51) Int. Cl.
*H04W 28/18* (2009.01)
*H04W 48/10* (2009.01)
*H04W 72/04* (2009.01)

(52) U.S. Cl.
CPC .......... *H04W 28/18* (2013.01); *H04W 48/10* (2013.01); *H04W 72/0453* (2013.01)

(58) Field of Classification Search
CPC . H04W 28/18; H04W 48/10; H04W 72/0453; H04W 48/08; H04W 48/00
See application file for complete search history.

(56) References Cited

U.S. PATENT DOCUMENTS

2010/0015969 A1  1/2010  Lee
2010/0091750 A1  4/2010  Lee
(Continued)

FOREIGN PATENT DOCUMENTS

CN   101601208 A   12/2009
CN   101682875 A   3/2010
(Continued)

OTHER PUBLICATIONS

International Search Report in international application No. PCT/CN2016/081879, dated Feb. 7, 2017.
(Continued)

*Primary Examiner* — Walter J DiVito

(57) ABSTRACT

Disclosed in the present invention are a system information transmission method, a base station, and a terminal, which can improve the flexibility of resource allocation. The method comprises: a base station obtains at least two wireless configuration parameter sets, each of the at least two wireless configuration parameter sets comprising at least one wireless configuration parameter, and values of the at least one wireless configuration parameter in any two wireless configuration parameter sets being different; among at least two wireless configuration parameter sets, the base station determines at least one wireless configuration parameter set for transmitting first system information in a first time period; and the base station sends, according to the at least one wireless configuration parameter set, the first system information in the first time period by means of at least one frequency-domain resource, the at least one frequency-domain resource being in a one-to-one correspondence with the at least one wireless configuration parameter set in the first time period, and frequencies corresponding to any two frequency-domain resources among the at least one frequency-domain resource being different.

22 Claims, 4 Drawing Sheets

(56) References Cited

U.S. PATENT DOCUMENTS

| | | | |
|---|---|---|---|
| 2010/0099425 A1 | 4/2010 | Lee | |
| 2011/0199950 A1 | 8/2011 | Klingenbrunn et al. | |
| 2012/0020310 A1 | 1/2012 | Ji et al. | |
| 2013/0176897 A1 | 7/2013 | Wang et al. | |
| 2014/0177587 A1 | 6/2014 | Lee et al. | |
| 2015/0016419 A1 | 1/2015 | Kim et al. | |
| 2015/0043491 A1* | 2/2015 | Eng | H04W 4/06 370/329 |
| 2015/0071223 A1* | 3/2015 | Lee | H04W 84/042 370/329 |
| 2015/0071244 A1 | 3/2015 | Lee et al. | |
| 2015/0079981 A1 | 3/2015 | Zhu et al. | |
| 2015/0319701 A1 | 11/2015 | Ng et al. | |
| 2016/0081130 A1 | 3/2016 | Wang et al. | |
| 2016/0338008 A1 | 11/2016 | Xia | |
| 2017/0311287 A1 | 10/2017 | Lee et al. | |
| 2018/0054800 A1* | 2/2018 | Yeo | H04W 72/08 |
| 2018/0302798 A1 | 10/2018 | Eng et al. | |
| 2019/0132749 A1* | 5/2019 | Wei | H04W 68/02 |
| 2020/0036498 A1 | 1/2020 | Lee et al. | |

FOREIGN PATENT DOCUMENTS

| | | | |
|---|---|---|---|
| CN | 102651890 A | 8/2012 | |
| CN | 103546920 A | 1/2014 | |
| CN | 103716856 A | 4/2014 | |
| EP | 2381716 A1 | 10/2011 | |
| EP | 2477443 A1 | 7/2012 | |
| EP | 2741547 A1 | 6/2014 | |
| EP | 3091806 A1 | 11/2016 | |
| JP | 2010506446 A | 2/2010 | |
| JP | 2010516163 A | 5/2010 | |
| RU | 2481737 C2 | 5/2013 | |
| RU | 2507685 C2 | 2/2014 | |
| WO | 0115344 A1 | 3/2001 | |
| WO | 2014043851 A1 | 3/2014 | |
| WO | 2014101810 A1 | 7/2014 | |
| WO | 2014163543 A1 | 10/2014 | |
| WO | 2015026392 A1 | 2/2015 | |
| WO | 2015113276 A1 | 8/2015 | |
| WO | 2016153266 A1 | 9/2016 | |

OTHER PUBLICATIONS

Written Opinion of the International Search Authority in international application No. PCT/CN2016/081879, dated Feb. 7, 2017.
Second Office Action of the Chinese application No. 201680084130. 5, dated Oct. 31, 2019.
Notice of Allowance of the Russian application No. 2018136947, dated Jul. 11, 2019.
First Office Action of Chinese application No. 201680084130.5, dated Aug. 14, 2019.
First Office Action of Taiwan application No. 106115182, dated Jul. 29, 2019.
English translation of the written opinion of the international search authority in international application No. PCT/CN2016/081879, dated Feb. 7, 2017.
Supplementary European Search Report in European application No. 16901293.7, dated Jan. 25, 2019.
First Office Action of the Japanese application No. 2018-554406, dated Feb. 21, 2020.
NTT Docomo, Inc., Initial Views on Numerology for NR Access Techonology[online]; 3GPP TSG-RAN WG1#84b R1-163113, <URL:http://www.3gpp.org/ftp/tsg_ran/WG1_RL1/TSGR1_84b/Docs/R1-163113.zip>, Apr. 15, 2016, Section 2.
Intel Corporation: "Overview of new radio access technology requirements and designs" 3GPP Draft: R1-162379—Intel 5G NR Overview. 3rd Generation Partnership Project (3GPP), vol. RAN WG1, No. Busan, Korea; Apr. 11, 2016-Apr. 15, 2016 Apr. 2, 2016 (Apr. 2, 2016), XP051080158, Retrieved from the Internet: URL: http://www. 3gpp. org/ftp/tsg_ran/WG1_RL1/TSGR1_84b/Docs/[ retrieved on Apr. 2, 2016]section 2.5*.
Notice of Rejection of the Taiwanese application No. 106115182, dated May 25, 2020.
Office Action of the Indian application No. 201817040703, dated Jul. 6, 2020.
European Search Report in the European application No. 20176337. 2, dated Jul. 7, 2020.
ZTE:"Numerology design of new RAT"; 3GPP TSG RAN WG1 Meeting #84bis R1-162227 Busan, Korea Apr. 11-15, 2016.
Intel Corporation:"Numerology for new radio interface"; 3GPP TSG RAN WG1 Meeting #84bis R1-162386 Busan, Korea Apr. 11-15, 2016.
MediaTek Inc.:"Numerology Considerations for Next Generation New Radio Access"; 3GPP TSG RAN WG1 Meeting #84bis R1-162795 Busan, Korea, Apr. 11-15, 2016.
NTT Docomo, Inc.:"Initial views on frame structure for NR access technology"; 3GPP TSG RAN WG1 Meeting #84bis R1-163112 Busan, Korea Apr. 11-15, 2016.
Ericsson:"Numerology for NR"; 3GPP TSG RAN WG1 Meeting #84bis R1-163227 Busan, Apr. 11-15, 2016.
First Office Action of the Brazilian application No. BR1120180724769, dated Sep. 8, 2020.
Second Office Action of the Canadian application No. 3018597, dated Aug. 13, 2020.
LG Electronics, "Discussion on Numerology Design for NR", 3GPP TSG RAN WG1 Meeting #84bis R1-162518, Busan, Korea, Apr. 11-15, 2016.
CATT, "Numerology for the 5G new radio interface", 3GPP TSG RAN WG1 Meeting #84bis R1-162307, Busan, Korea, Apr. 11-15, 2016.
Nokia, Alcatel-Lucent Shanghai Bell, "Flexible numerology for 5G New Radio", 3GPP TSG-RAN WG1 Meeting #84bis R1-162894, Busan, Korea Apr. 11-15, 2016.
Sharp, "Scalable numerology for New RAT", 3GPP TSG RAN WG1 Meeting #84bis R1-163295, Busan, Korea, Apr. 11-15, 2016.
Notice of Opposition of the European application No. 16901293.7, dated Apr. 15, 2021.
Office Action of the Australian application No. 2016406527, dated Mar. 9, 2021.
Review Decision of the Chinese application No. 201680084130.5, dated Nov. 4, 2020.
Third Office Action of the Canadian application No. 3018597, dated Jun. 4, 2021.

* cited by examiner

SYSTEM INFORMATION TRANSMISSION METHOD, BASE STATION, AND TERMINAL

TECHNICAL FIELD

The disclosure relates to the field of communications, and more particularly to a method for transmitting system information, a base Station (ST) and a terminal.

BACKGROUND

In a Long Term Evolution (LTE) system, a base ST sends system information (for example, a Master Information Block (MIB)) on the basis of a specific radio configuration parameter set (for example, including a subcarrier spacing, an Orthogonal Frequency Division Multiplexing (OFDM) symbol length, a Cyclic Prefix (CP) length, an OFDM number, a subframe length and a radio frame length) through a specific time-frequency resource. A terminal, after receiving the system information on the specific time-frequency resource, acquires data from the system information according to the specific radio configuration parameter set to further complete cell access. That is, the time-frequency resource for system information transmission between the base ST and the terminal is predetermined, and the radio configuration parameter set configured to transmit the system information is also predetermined.

However, in the same cell, a radio configuration parameter set configured to send system information is constant, and a base ST may send the system information on the basis of only one specific radio configuration parameter set at the same time. This may not meet network requirements of users of different scenarios, different services and different time buckets.

Therefore, a technology is required to improve radio resource configuration flexibility and ensure that a radio configuration parameter set may meet different requirements.

SUMMARY

The disclosure provides a method for transmitting system information, a base ST and a terminal, so as to improve radio resource configuration flexibility and ensure that a radio configuration parameter set may meet different requirements.

According to a first aspect, the disclosure provides a method for transmitting system information, which may include that: a base ST acquires at least two radio configuration parameter sets, each of the at least two radio configuration parameter sets including at least one radio configuration parameter and any two radio configuration parameter sets of the at least two radio configuration parameter sets being different from each other in terms of at least one radio configuration parameter; the base ST determines at least one of the at least two radio configuration parameter sets as at least one first radio configuration parameter set for transmitting first system information during a first time period; and the base ST sends the first system information during the first time period via at least one first frequency-domain resource based on the at least one first radio configuration parameter set, the at least one first frequency-domain resource corresponding to the at least one first radio configuration parameter set one to one during the first time period and any two frequency-domain resources of the at least one first frequency-domain resource corresponding to different frequencies.

The at least two radio configuration parameter sets configured to transmit system information are acquired, and then the base ST may send the first system information on the basis of the at least one first radio configuration parameter set in the at least two radio configuration parameter sets, that is, the first system information may be sent in the same time bucket on the basis of multiple radio configuration parameter sets through multiple frequency-domain resources, so that radio resource configuration flexibility may be improved. Moreover, a terminal acquires the at least two radio configuration parameter sets and determines the first radio configuration parameter set configured to receive the first system information in the at least two radio configuration parameter sets, thereby accurately acquiring the first system information. In a network selection, cell reselection or cell handover process after the terminal is turned on, by use of the disclosure, the system information sent by the base ST may be rapidly and accurately acquired and cell access efficiency of the terminal may be improved.

In combination with the first aspect, in a first possible implementation of the first aspect, the method may further include that: the base ST determines at least one of the at least two radio configuration parameter sets as at least one second radio configuration parameter set for transmitting the first system information during a second time period; and the base ST sends the first system information during the second time period via at least one second frequency-domain resource based on the at least one second radio configuration parameter set, the at least one second frequency-domain resource corresponding to the at least one second radio configuration parameter set one to one during the second time period and any two frequency-domain resources of the at least one second frequency-domain resource corresponding to different frequencies.

In such a manner, the base ST may send the first system information during different time periods through at least one frequency-domain resource which is the same or different, the same frequency-domain resource during different time periods may correspond to different radio configuration parameter sets and the radio configuration parameter set configured to send the first system information may be dynamically regulated in the same cell, so that the resource configuration flexibility is further improved.

In combination with the first aspect, in a second possible implementation of the first aspect, the base ST may determine at least one of the at least two radio configuration parameter sets as at least one first radio configuration parameter set for transmitting first system information during a first time period according to at least one of: a carrier frequency band to which the frequency-domain resource corresponding to each of the at least one first radio configuration parameter set belongs and a carrier frequency-domain width, a geographical position and surrounding environment of the base ST, a transmission power at which the first system information is sent or an antenna form for sending of the first system information.

The at least two radio configuration parameter sets are determined according to each factor listed above, so that base STs in different scenarios, different geographical positions and different environments may transmit system information by use of radio configuration parameters adapted to different requirements, and higher resource configuration flexibility and reasonability are ensured.

In combination with the abovementioned possible implementations of the first aspect, in a third possible implementation of the first aspect, the first system information may include first indication information, and the first indication information may be configured to indicate at least one of a time-frequency resource or radio configuration parameter set used by the base ST for sending second system information, wherein the first system information may include an MIB, and the second system information may include at least one System Information Block (SIB). The radio configuration parameter set used for sending the second system information may be part or all of the at least two radio configuration parameter sets and may also be another radio configuration parameter set. Similarly, the time-frequency resource used for sending the second system information may be part or all of at least two time-frequency resources used for sending the first system information and may also be another time-frequency resource.

The first indication information configured to indicate the time-frequency resource and/or radio configuration parameter set corresponding to the second system information is contained in the first system information, and then the terminal, after acquiring the first system information, may rapidly acquire the second system information according to the first indication information without a repeated search process, so that system information acquisition efficiency of the terminal is greatly improved.

In combination with the abovementioned possible implementations of the first aspect, in a fourth possible implementation of the first aspect, the base ST may be a base ST for a first cell, a terminal may be a terminal located in the first cell, and the method may further include that: the base ST sends second indication information to the terminal, the second indication information indicating at least one of a time-frequency resource or radio configuration parameter set used by the terminal for receiving third system information, the third system information being system information for a second cell and the second cell being adjacent to the first cell.

The second indication information for the time-frequency resource and/or radio configuration parameter set corresponding to the third system information of the second cell is sent to the terminal, so that the terminal located in the cell may rapidly and accurately acquire the system information (i.e., the third system information) of the adjacent cell to complete cell reselection or cell handover.

In combination with the abovementioned possible implementations of the first aspect, in a fifth possible implementation of the first aspect, the method may further include that: the base ST sends third indication information to the terminal, the third indication information indicating an offset between a timing of the first cell and a timing of the second cell.

In case of asynchronous timing between the cells, the third indication information configured to indicate the timing offset is sent to the terminal, so that the terminal may rapidly and accurately acquire the third system information according to the timing offset indicated by the third indication information and the time-frequency resource and/or radio configuration parameter set indicated by the second indication information to complete cell reselection or cell handover conveniently.

According to a second aspect, the disclosure provides a method for transmitting system information, which may include that: a terminal acquires at least two radio configuration parameter sets, each of the at least two radio configuration parameter sets including at least one radio configuration parameter and any two radio configuration parameter sets of the at least two radio configuration parameter sets being different from each other in terms of at least one radio configuration parameter; and the terminal receives first system information sent by a base ST in a first time bucket on the basis of at least one first radio configuration parameter set in the at least two radio configuration parameter sets through at least one first frequency-domain resource, the at least one first frequency-domain resource corresponding to the at least one first radio configuration parameter set one to one during the first time period and any two frequency-domain resources of the at least one first frequency-domain resource corresponding to different frequencies.

The terminal determines the at least one first radio configuration parameter set configured to receive the first system information in the at least two radio configuration parameter sets, thereby accurately acquiring the first system information. In a network selection, cell reselection or cell handover process after the terminal is turned on, by use of the disclosure, the system information sent by the base ST may be rapidly and accurately acquired and cell access efficiency of the terminal may be improved.

In combination with the second aspect, in a first possible implementation of the second aspect, the terminal may determine the at least one first frequency-domain resource configured for receiving the first system information; the terminal may determine a first group of the radio configuration parameter sets, corresponding to a frequency corresponding to the at least one first frequency-domain resource, of the at least two radio configuration parameter sets according to the frequency corresponding to each frequency-domain resource in the first frequency-domain resource, the first group including the at least one first radio configuration parameter set; and the terminal may receive from the base ST the first system information during the first time period via the at least one first frequency-domain resource based on the at least one first radio configuration parameter set.

The terminal may determine the at least one first radio configuration parameter set according to the at least one first frequency-domain resource, so that the first radio configuration parameter set in the at least two radio configuration parameter sets may be determined more rapidly and accurately, and system information acquisition efficiency of the terminal may be improved.

In combination with the abovementioned possible implementation of the second aspect, in a second possible implementation of the second aspect, the method may further include that: the terminal determines at least one second radio configuration parameter set, for receiving the first system information during a second time period, of the at least two radio configuration parameter sets; and the terminal receives the first system information during the second time period via at least one second frequency-domain resource based on the at least one second radio configuration parameter set, the at least one second frequency-domain resource corresponding to the at least one second radio configuration parameter set one to one during the second time period and any two frequency-domain resources of the at least one second frequency-domain resource corresponding to different frequencies.

In such a manner, the terminal may receive the first system information during different time periods through at least one frequency-domain resource which is the same or different, and the same frequency-domain resource during different time periods may correspond to different radio configuration parameter sets, so that the resource configuration flexibility is further improved.

In combination with the abovementioned possible implementations of the second aspect, in a third possible implementation of the second aspect, the method may further include that: the terminal acquires first indication information from the first system information, the first indication information indicating at least one of a time-frequency resource or radio configuration parameter set used by the terminal for receiving second system information, wherein the first system information may include an MIB, and the second system information may include at least one SIB.

The first indication information configured to indicate the time-frequency resource and/or radio configuration parameter set corresponding to the second system information is contained in the first system information, and then the terminal, after acquiring the first system information, may rapidly acquire the second system information according to the first indication information without a repeated search process, so that the system information acquisition efficiency of the terminal is greatly improved.

In combination with the abovementioned possible implementations of the second aspect, in a fourth possible implementation of the second aspect, the terminal may be a terminal located in a first cell, the base ST may be a base ST for the first cell, and the method may further include that: the terminal receives second indication information sent by the base ST, the second indication information indicating at least one of a time-frequency resource or radio configuration parameter set used by the terminal for receiving third system information, wherein the third system information may be system information for a second cell, and the second cell may be adjacent to the first cell; and the terminal receives the third system information according to the second indication information.

The second indication information for the time-frequency resource and/or radio configuration parameter set corresponding to the third system information of the second cell is sent to the terminal, so that the terminal located in the cell may rapidly and accurately acquire the system information (i.e., the third system information) of the adjacent cell to complete cell reselection or cell handover.

In combination with the abovementioned possible implementations of the second aspect, in a fifth possible implementation of the second aspect, the method may further include that: the terminal receives third indication information sent by the base ST, the third indication information indicating an offset between a timing of the first cell and a timing of the second cell; and the terminal receives the third system information according to the second indication information and the third indication information.

In case of asynchronous timing between the cells, the third indication information configured to indicate the timing offset is sent to the terminal, so that the terminal may rapidly and accurately acquire the third system information according to the timing offset indicated by the third indication information and the time-frequency resource and/or radio configuration parameter set indicated by the second indication information to complete cell reselection or cell handover conveniently.

According to a third aspect, the disclosure provides a base ST, which is configured to execute the method in the first aspect or any possible implementation of the first aspect. Specifically, the base ST includes modules configured to execute the method in the first aspect or any possible implementation of the first aspect.

According to a fourth aspect, the disclosure provides a terminal, which is configured to execute the method in the second aspect or any possible implementation of the second aspect. Specifically, the terminal includes modules configured to execute the method in the second aspect or any possible implementation of the second aspect.

According to a fifth aspect, the disclosure provides a base ST, which includes a transceiver, a memory, a processor and a bus system, wherein the transceiver, the memory and the processor are connected through the bus system, the memory is configured to store an instruction, the processor is configured to execute the instruction stored in the memory to control the transceiver to send and receive signals, and when the processor executes the instruction stored in the memory, such execution enables the processor to execute the method in the first aspect or any possible implementation of the first aspect.

According to a sixth aspect, the disclosure provides a terminal, which includes a transceiver, a memory, a processor and a bus system, wherein the transceiver, the memory and the processor are connected through the bus system, the memory is configured to store an instruction, the processor is configured to execute the instruction stored in the memory to control the transceiver to send and receive signals, and when the processor executes the instruction stored in the memory, such execution enables the processor to execute the method in the second aspect or any possible implementation of the second aspect.

According to a seventh aspect, the disclosure provides a computer-readable medium, which is configured to store a computer program, the computer program including an instruction configured to execute the method in the first aspect or any possible implementation of the first aspect.

According to an eighth aspect, the disclosure provides a computer-readable medium, which is configured to store a computer program, the computer program including an instruction configured to execute the method in the second aspect or any possible implementation of the second aspect.

In some implementations, the radio configuration parameter may include at least one of: a subcarrier spacing, an OFDM symbol length, a CP length, a total number of OFDM symbols, a radio frame length and a subframe length.

The application provides the method for transmitting system information, the base ST and the terminal, so that radio resource configuration flexibility may be improved, and a radio configuration parameter set may meet different requirements.

BRIEF DESCRIPTION OF DRAWINGS

In order to describe the technical solutions of the embodiments of the disclosure more clearly, the drawings required to be used in the embodiments of the disclosure will be simply introduced below. It is apparent that the drawings described below are only some embodiments of the disclosure. Other drawings may further be obtained by those of ordinary skill in the art according to these drawings without creative work.

DETAILED DESCRIPTION

Figure 1:
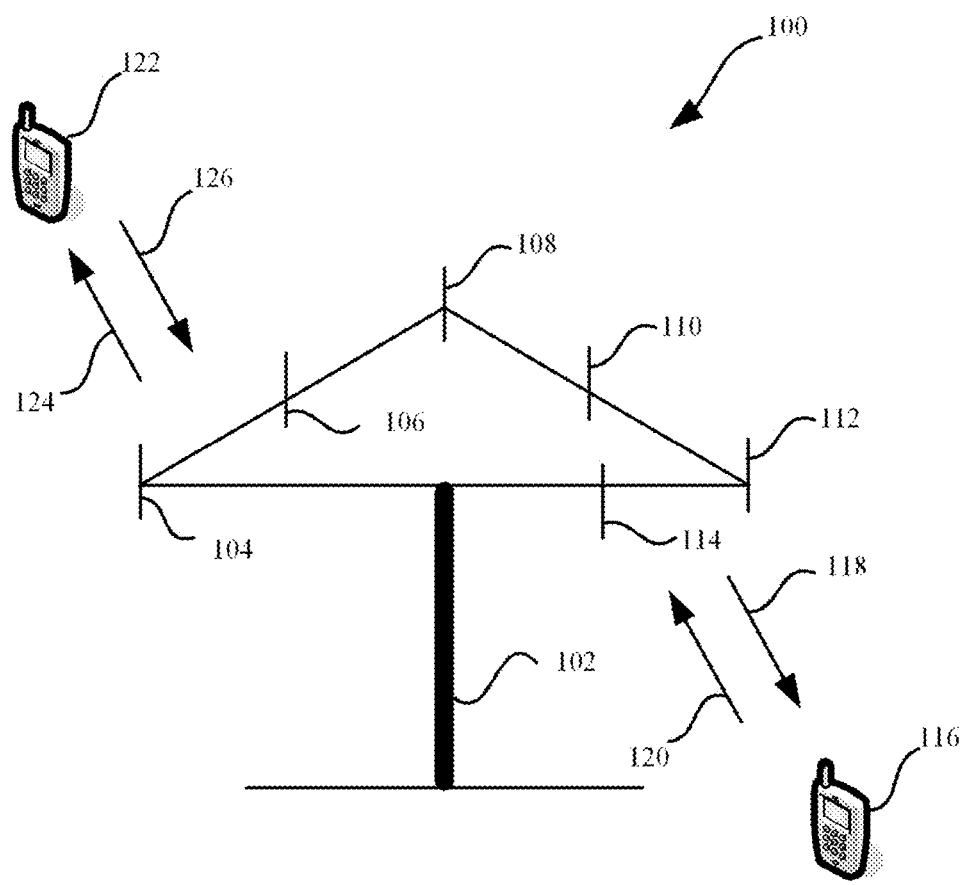
FIG. 1 is a schematic diagram of a communication system using a method for transmitting system information of the disclosure.

The technical solutions in the embodiments of the disclosure will be clearly and completely described below in combination with the drawings in the embodiments of the disclosure. It is apparent that the described embodiments are not all embodiments but part of embodiments of the disclosure. All other embodiments obtained by those of ordinary skill in the art on the basis of the embodiments in the disclosure without creative work shall fall within the scope of protection of the disclosure.

Terms "part" "module", "system" and the like used in the specification are adopted to represent a computer related entity, hardware, firmware, hardware and software combination, software or software in execution. For example, a part may be, but not limited to, a process running on a processor, the processor, an object, an executable file, an execution thread, a program and/or a computer. The drawings show that an application running on computing equipment and the computing equipment may both be parts. One or more parts may reside in a process and/or an execution thread, and the parts may be located on a computer and/or distributed between two or more computers. In addition, these parts may be executed from various computer-readable media with various data structures stored thereon. The "parts" may communicate through local and/or remote processes according to, for example, signals with one or more data groups (for example, data from two parts interacting with another part of a local system, a distributed system and/or a network, for example, the Internet interacting with another system through signals).

It is to be understood that the technical solutions of the disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an Advanced Long Term Evolution (LTE-A) system, a Universal Mobile Telecommunication System (UMTS) and 5th-Generation (5G).

Optionally, network equipment is a base ST and terminal equipment is User Equipment (UE).

Each embodiment of the disclosure is described in combination with the terminal equipment. The terminal equipment may also be called UE, an access terminal, a user unit, a user ST, a mobile radio ST, a mobile ST, a remote ST, a remote terminal, mobile equipment, a user terminal, a terminal, wireless communication equipment, a user agent, a user device or the like. The terminal equipment may be an ST in a Wireless Local Area Network (WLAN), and may be a cell phone, a cordless phone, a Session Initiation Protocol (SIP) phone, a Wireless Local Loop (WLL) ST, a Personal Digital Assistant (PDA), handheld equipment with a wireless communication function, computing equipment, other processing equipment connected to a wireless modem, vehicle-mounted equipment, wearable equipment, terminal equipment in a future 5G network, terminal equipment in a future evolved Public Land Mobile Network (PLMN) or the like.

In addition, each embodiment of the disclosure is described in combination with the network equipment. The network equipment may be equipment, for example, network equipment, configured to communicate with mobile equipment. The network equipment may be an Access Point (AP) in the WLAN, a Base Transceiver Station (BTS) in the GSM or CDMA, may also be a NodeB (NB) in WCDMA, and may further be an Evolutional Node B (eNB or eNodeB) in LTE, or a relay ST or AP, or vehicle-mounted equipment, wearable equipment, terminal equipment in the future 5G network, network equipment in the future evolved PLMN or the like.

In addition, each aspect or characteristic of the disclosure may be implemented into a method, a device or a product programed with a standard and/or using an engineering technology. Term "product" used in the disclosure covers a computer program which may be accessed from any computer-readable device, carrier or medium. For example, the computer-readable medium may include, but not limited to: a magnetic storage device (for example, a hard disk, a floppy disk or a magnetic tape), an optical disk (for example, a Compact Disk (CD) and a Digital Versatile Disk (DVD)), a smart card and a flash memory (for example, an Erasable Programmable Read-Only Memory (EPROM), a card, a stick or a key driver). In addition, various storage media described in the disclosure may represent one or more pieces of equipment and/or other machine-readable media configured to store information. Term "machine-readable medium" may include, but not limited to, a wireless channel and various other media capable of storing, including and/or bearing instructions and/or data.

FIG. 1 is a schematic diagram of a communication system using an information transmission method of the disclosure. As illustrated in FIG. 1, the communication system 100 includes network equipment 102, and the network equipment 102 may include multiple antennae, for example, antennae 104, 106, 108, 110, 112 and 114. In addition, the network equipment 102 may additionally include a sender chain and a receiver chain. Those of ordinary skill in the art may understand that each of them may include multiple components (for example, a processor, a modulator, a multiplexer, a demodulator, a demultiplexer or an antenna) related to signal sending and receiving.

The network equipment 102 may communicate with multiple pieces of terminal equipment (for example, terminal equipment 116 and terminal equipment 122). However, it can be understood that the network equipment 102 may communicate with any number of terminal equipment like the terminal equipment 116 or 122. The terminal equipment 116 and 122 may be, for example, cell phones, smart phones, portable computers, handheld communication equipment, handheld computing equipment, satellite radio devices, global positioning systems, PDAs and/or any other suitable equipment configured for communication in the wireless communication system 100.

As illustrated in FIG. 1, the terminal equipment 116 communicates with the antennae 112 and 114, wherein the antennae 112 and 114 send information to the terminal equipment 116 through a forward link 118 and receive information from the terminal equipment 116 through a reverse link 120. In addition, the terminal equipment 122 communicates with the antennae 104 and 106, wherein the antennae 104 and 106 send information to the terminal equipment 122 through a forward link 124 and receive information from the terminal equipment 122 through a reverse link 126.

For example, in a Frequency Division Duplex (FDD) system, for example, the forward link 118 may use a frequency band different from that used by the reverse link 120, and the forward link 124 may use a frequency band different from that used by the reverse link 126.

For another example, in a Time Division Duplex (TDD) system and a full duplex system, the forward link 118 and the reverse link 120 may use the same frequency band, and the forward link 124 and the reverse link 126 may use the same frequency band.

Each antenna (or an antenna group formed by multiple antennae) and/or region designed for communication are/is called sectors/a sector of the network equipment 102. For example, the antenna group may be designed to communicate with terminal equipment in a sector of a coverage area of the network equipment 102. In a process that the network equipment 102 communicates with the terminal equipment 116 and 122 through the forward links 118 and 124 respectively, a sending antenna of the network equipment 102 may use beamforming to improve signal noise ratios of the forward links 118 and 124. In addition, compared with a manner that the network equipment sends signals to all its terminal equipment through a single antenna, when the network equipment 102 sends signals to the terminal equipment 116 and 122 randomly scattered in the related coverage area by use of beamforming, mobile equipment in an adjacent cell may be interfered less.

In a given time, the network equipment 102, the terminal equipment 116 or the terminal equipment 122 may be a wireless communication sending device and/or a wireless communication receiving device. When data is sent, the wireless communication sending device may code the data for transmission. Specifically, the wireless communication sending device may acquire (for example, generation, receiving from another communication device or storage in a memory) a certain number of data bits to be sent to the wireless communication receiving device through a channel. The data bits may be included in a transmission block (or multiple transmission blocks) of the data, and the transmission block may be segmented to generate multiple code blocks.

In addition, the communication system 100 may be a PLMN or a Device to Device (D2D) network or a Machine to Machine (M2M) network or another network. FIG. 1 is only a simplified schematic diagram listed as an example, and the network may further include other network equipment which is not drawn in FIG. 1.

Figure 2:
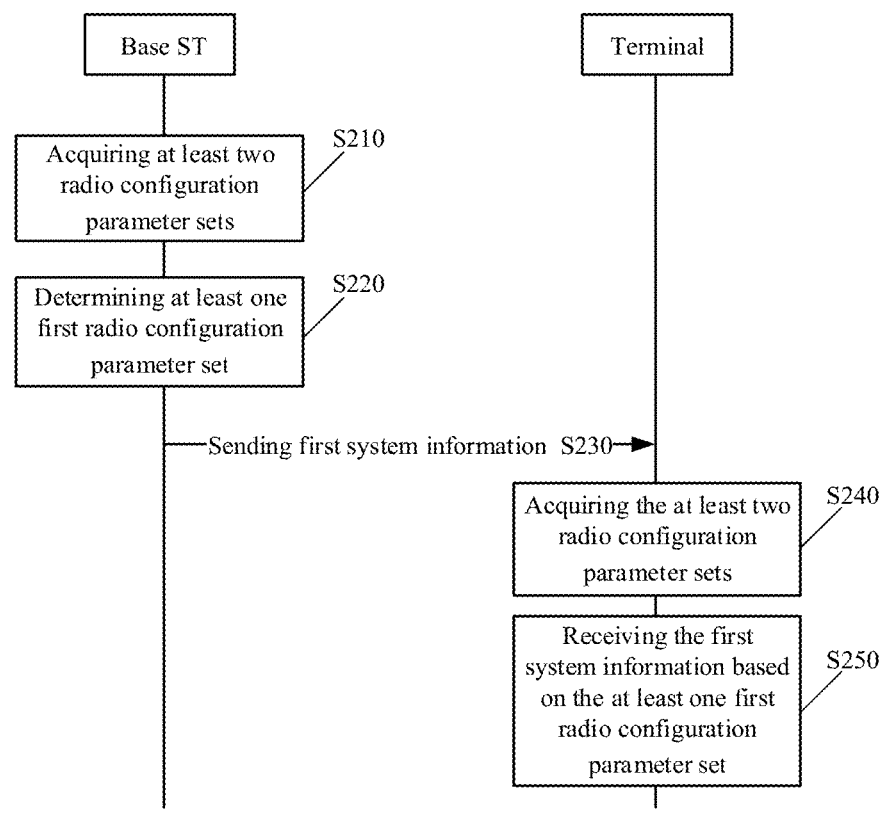
FIG. 2 is a schematic flowchart of a method for transmitting system information according to an embodiment of the disclosure.

FIG. 2 is a schematic flowchart of a method for transmitting system information 200 according to an embodiment of the disclosure. It is to be understood that FIG. 2 illustrates detailed communication actions or operations of the method for transmitting system information described from the angle of equipment interaction according to an embodiment of the disclosure. However, these actions or operations are only examples and other operations or transformations of various operations in FIG. 2 may also be executed in the embodiment of the disclosure. In addition, each action in FIG. 2 may be executed in a sequence different from that presented in FIG. 2 and not all the operations in FIG. 2 may be executed.

It should also be understood that the method for transmitting system information 200 of the embodiment of the disclosure may be applied to a scenario where cell reselection is required when a terminal selects a network after being turned on or the terminal is switched from an idle state to a connected state. Specifically, the terminal, after being turned on or when being switched from the idle state to the connected state, is required to perform cell search and synchronization, acquire system information of a cell and perform random access. The embodiment of the disclosure may specifically be applied to a scenario where the terminal acquires the system information of the cell after completing cell search and synchronization. However, an application scenario of the disclosure is not limited, the disclosure may also be applied to a cell handover scenario and a specific process of application of the disclosure to cell handover will be described hereinafter in detail.

Here, there is made such a hypothesis that a base ST is a base ST for a first cell and the terminal is a terminal located in the first cell, and a specific process that the terminal acquires system information of the first cell from the base ST may be completed by executing the method 200.

As illustrated in FIG. 2, the method 200 includes the following actions.

In S210, the base ST acquires at least two radio configuration parameter sets. Each of the at least two radio configuration parameter sets includes at least one radio configuration parameter. And any two radio configuration parameter sets are different from each other in terms of at least one radio configuration parameter.

Here, exemplarily but unlimitedly, the radio configuration parameter includes a subcarrier spacing, an OFDM symbol length, a CP length, a total number of OFDM symbols, a radio frame length and a subframe length. It is to be understood that the radio configuration parameter may be configured to transmit information between the base ST and the terminal. For example, the base ST modulates the information on the basis of the radio configuration parameter and the terminal modulates the information on the basis of the radio configuration parameter. The radio configuration parameters listed above are only exemplarily described and should not form any limit to the disclosure. The radio configuration parameter includes a parameter on the basis of which the information is transmitted between the base ST and the terminal, which is not specially limited in the disclosure.

In the embodiment of the disclosure, the base ST may acquire the at least two radio configuration parameter sets in advance. Each radio configuration parameter set includes the at least one radio configuration parameter. And any two radio configuration parameter sets are different from each other in terms of at least one radio configuration parameter. That is, values of the radio configuration parameters included in any two radio configuration parameter sets are partially or completely different.

The base ST may transmit information on the basis of any radio configuration parameter set, and multiple radio configuration parameters may be freely combined to obtain multiple radio configuration parameter sets. For example, for the radio configuration parameter listed above, the subcarrier spacing may be 1.25 kHz, 15 kHz or 75 kHz, the subframe length may be 0.25 ms, 1 ms or 2.5 ms, and there may be many combinations for the subcarrier spacing and the subframe length. For example, the subcarrier spacing is 1.25 kHz and the subframe length is 0.25 ms; and the subcarrier spacing is 1.25 kHz and the subframe length is 1 ms. The combinations will not be listed herein one by one. If the terminal receives the information on the basis of various combinations of the multiple radio configuration parameters, the radio configuration parameter set capable of accurately receiving the information may finally be determined only after various possible radio configuration parameter sets are traversed.

Therefore, in the embodiment of the disclosure, the at least two radio configuration parameter sets configured to transmit the system information may be predefined. The base ST may send first system information on the basis of the first radio configuration parameter set in the at least two radio configuration parameter sets. And the terminal may receive the first system information on the basis of the first radio configuration parameter set in the at least two radio configuration parameter sets.

It is to be understood that the at least two radio configuration parameter sets predefined in the embodiment of the disclosure are not only configured to transmit the system information but also configured to transmit data or signaling, which is not specially limited in the disclosure.

Optionally, the method 200 further includes the following operations.

The base ST determines a value set of each radio configuration parameter supported by a system, each value set corresponding to a parameter.

And the base ST determines the at least two radio configuration parameter sets according to the value set of each radio configuration parameter.

Specifically, the base ST may determine all values of each radio configuration parameter supported by the system. Each radio configuration parameter corresponds to a value set (recorded as a first value set for convenient distinction and understanding). And the first value set of each radio configuration parameter includes at least one value of the radio configuration parameter. For example, all subcarrier spacings supported by the system are 1.25 kHz*M, $M \in [1, 60]$, or, all subframe lengths supported by the system are t*N (for example, t is 0.125 ms), $N \in [1, 40]$. A numerical value is extracted from the first value set of each radio configuration parameter, and multiple radio configuration parameters may be combined to determine multiple (supposed to be S, S being a natural number more than or equal to 2) radio configuration parameter sets.

Furthermore, the base ST may predefine part of values in the first value set as a value set (recorded as a second value set for convenient distinction and understanding) of each radio configuration parameter in the radio configuration parameter set. For example, a value set of the subcarrier spacing is defined to be (1.25 kHz, 15 kHz, 75 kHz) and a value set of the subframe length is defined to be (0.25 ms, 1 ms, 2.5 ms). That is, the second value set is a subset of the first value set. A numerical value is extracted from the second value set of each radio configuration parameter, and multiple radio configuration parameters may be combined to determine multiple (supposed to be T, T being a natural number more than or equal to 2) radio configuration parameter sets. It is apparent that $S \gg T$.

It is to be noted that the base ST may determine a first time-frequency resource used for sending the first system information before determining the first radio configuration parameter set. The first time-frequency resource used by the base ST for sending the first system information may be preset by an operating company. For example, the operating company may determine it according to a factor such as a carrier frequency band available for the base ST and coverage of the base ST. A specific time-frequency resource may also be determined as the first time-frequency resource by an operator. There are no special limits made in the disclosure.

In S220, the base ST determines at least one of the at least two radio configuration parameter sets as at least one first radio configuration parameter set for transmitting first system information during a first time period.

For convenient distinction, a frequency-domain resource sending the first system information during the first time period is recorded as a first frequency-domain resource, and the radio configuration parameter set configured to send the first system information during the first time period is recorded as a first radio configuration parameter set.

In the embodiment of the disclosure, the first system information may be configured to indicate an uplink/downlink bandwidth. Optionally, the first system information may also be configured to indicate a System Frame Number (SFN), an antenna number and a control signal transmission mode. Optionally, the first system information may also be configured to indicate whether there exist multiple radio configuration parameters in the cell or not. It is to be noted that, in the first system information sent by the base ST in the same time bucket on the basis of multiple first radio configuration parameter sets through multiple first frequency-domain resources, the SFN is progressively increased within a frame range of 0~4,095, each piece of first system information including different SFNs, the other information in each piece of first system information may be the same, that is, the information born in each piece of first system information is constant.

Optionally, the base ST may determine the at least one first radio configuration parameter set configured to transmit the first system information in the at least two radio configuration parameter sets according to at least one of: a carrier frequency band to which the frequency-domain resource corresponding to each of the at least one first radio configuration parameter set belongs and a carrier frequency-domain width, a geographical position and surrounding environment of the base ST, a transmission power at which the first system information is sent or an antenna form for sending of the first system information.

Specifically, the base ST, after determining the first frequency-domain resource configured to send the first system information during the first time period, may further determine the first radio configuration parameter set according to the carrier frequency band to which the first frequency-domain resource belongs as well as the carrier frequency-domain width.

For example, at first, the base ST may determine a corresponding subcarrier spacing according to the carrier frequency band to which the first frequency-domain resource used for sending the first system information during the first time period as well as the carrier frequency-domain width. For example, when the carrier frequency band is 2 GHz-4 GHz, it may be determined that the corresponding subcarrier spacing is 15 kHz; when the carrier frequency band is 30 GHz/70 GHz, it may be determined that the subcarrier spacing is 75 kHz; and when the carrier frequency band is lower than 700 MHz, it may be determined that the subcarrier spacing is 7.5 kHz.

Then, the base ST may determine a corresponding OFDM symbol length and a possible CP length according to the determined subcarrier spacing, further determines a possible subframe length and radio frame length and finally determines the OFDM number.

For another example, the base ST may also determine a corresponding CP length according to the a transmission power at which the first system information is sent or the antenna form for sending of the first system information. When the transmitted power is relatively high or an antenna is relatively high, a relatively large CP length may be used.

For another example, the base ST may also determine coverage of the first system information according to each factor such as its geographical position and surrounding environment and the transmitted power and antennae form for sending of the first system information and further determine the corresponding CP length according to the coverage. For example, in a large-coverage scenario of a suburban district, a relatively large CP length may be used;

and in a small-coverage scenario such as a dense urban area or a room, a relatively small CP length may be used.

It is to be understood that methods, listed above, for determining the radio configuration parameters are all exemplarily described. For example, the subcarrier spacing may be related to the carrier frequency band and the carrier frequency-domain width and is determined by the carrier frequency band and the carrier frequency-domain width, and may also not be determined according to the carrier frequency band and the carrier frequency-domain width. For another example, each radio configuration parameter may be determined by at least one factor in the carrier frequency band to which the frequency-domain resource configured to transmit the first system information belongs, the geographical position and surrounding environment of the base ST, the a transmission power at which the first system information is sent or the antenna form for sending of the first system information, and may also be determined by multiple factors. Moreover, factors for determining the radio configuration parameters include, but not limited to, the abovementioned factors. The factors listed above should not form any limit to the disclosure. For example, the base ST may also determine the corresponding subcarrier spacing, according to a relative movement velocity of the terminal. Specifically, when the relative movement velocity of the terminal is relatively high (for example, a moving train), a relatively large subcarrier spacing may be used.

In S230, the base ST sends the first system information during the first time period via at least one first frequency-domain resource based on the at least one first radio configuration parameter set, the at least one first frequency-domain resource and the at least one first radio configuration parameter set having one-to-one correspondences during the first time period, and any two frequency-domain resources of the at least one first frequency-domain resource corresponding to different frequencies.

The base ST, after determining the at least one first frequency-domain resource and at least one first radio configuration parameter set configured to send the first system information during the first time period, may send the first system information on the basis of the at least one first radio configuration parameter set through the at least one first frequency-domain resource.

It is to be noted that the at least one first frequency-domain resource may form a one-to-one corresponding relationship with the at least one first radio configuration parameter set during the first time period. That is, a frequency-domain resource A (i.e., an example of the first frequency-domain resource) corresponds to a radio configuration parameter set A (i.e., an example of the first radio configuration parameter set), and a frequency-domain resource B (i.e., another example of the first frequency-domain resource) corresponds to a radio configuration parameter set B (i.e., another example of the first radio configuration parameter set). That is, the base ST may send the first system information during the first time period on the basis of the radio configuration parameter set A through the frequency-domain resource A, may also send the first system information on the basis of the radio configuration parameter set B through the frequency-domain resource B and so on, which will not be listed herein one by one. Moreover, any two frequency-domain resources of the at least one first frequency-domain resource correspond to different frequencies and any two radio configuration parameter sets in the at least one first radio configuration parameter set are different.

It is to be noted that the one-to-one corresponding relationship between the at least one first frequency-domain resource and the at least one first radio configuration parameter set during the first time period should not form any limit to the disclosure. In another time bucket (for example, a second time bucket) different from the first time bucket, the at least one first frequency-domain resource may not form the one-to-one corresponding relationship with the at least one first radio configuration parameter set. For example, the frequency-domain resource A may form a corresponding relationship with the radio configuration parameter set B and the frequency-domain resource B may form a corresponding relationship with the radio configuration parameter set A, or, the frequency-domain resource A may form a corresponding relationship with another radio configuration parameter set. There are no special limits made in the disclosure.

Optionally, the method 200 further includes the following operations.

The base ST determines at least one of the at least two radio configuration parameter sets as at least one second radio configuration parameter set for transmitting the first system information during a second time period.

And the base ST sends the first system information during the second time period via at least one second frequency-domain resource based on the at least one second radio configuration parameter set. The at least one second frequency-domain resource and the at least one second radio configuration parameter set have one-to-one correspondences during the second time period, and any two frequency-domain resources of the at least one second frequency-domain resource correspond to different frequencies.

Specifically, the base ST may regulate the frequency-domain resource and radio configuration parameter set configured to send the first system information in the same cell but different time buckets. For convenient distinction, a frequency-domain resource sending the first system information during the second time period is recorded as a second frequency-domain resource, and a radio configuration parameter set configured to send the first system information during the second time period is recorded as a second radio configuration parameter set.

It is to be noted that the second frequency-domain resource configured to send the first system information during the second time period may be completely the same as, partially the same as or completely different from the first frequency-domain resource configured to send the first system information during the first time period. The second radio configuration parameter set configured to send the first system information during the second time period may be completely the same as, partially the same as or completely different from the first radio configuration parameter set configured to send the first system information during the first time period. Moreover, during the second time period, the at least one second radio configuration parameter set corresponds to the at least one second frequency-domain resource one to one. That is, the corresponding relationship between the radio configuration parameter set and the frequency-domain resource during the first time period may change and may not change during the second time period, which is not specially limited in the disclosure.

That is, during the first time period, the at least one first radio configuration parameter set corresponds to the at least one first frequency-domain resource one to one; and during the second time period, the at least one second radio configuration parameter set corresponds to the at least one second frequency-domain resource. Here, the at least one first radio configuration parameter set may be the same as or different from the at least one second radio configuration parameter set, and the at least one first frequency-domain resource may also be the same as or different from the at least one second frequency-domain resource. Under the condition that the at least one first radio configuration parameter set is the same as the at least one second radio configuration parameter set and the at least one first frequency-domain resource is the same as the at least one second frequency-domain resource, the corresponding relationship between the at least one first frequency-domain resource and the at least one first radio configuration parameter set may also be different from a corresponding relationship between the at least one second frequency-domain resource and the at least one second radio configuration parameter set.

In other words, during different time periods, the base ST may send the first system information by use of the same or different radio configuration parameter sets; during different time periods, the base ST may send the first system information by use of the same or different frequency-domain resources; and during different time periods, the corresponding relationships between the frequency-domain resources and the radio configuration parameters may be the same or different.

It is to be understood that "first" and "second" are only adopted to distinguish the frequency-domain resources and radio configuration parameter sets used during different time periods and should not form any limit to the disclosure.

In S240, the terminal acquires at least two radio configuration parameter sets. Each of the at least two radio configuration parameter sets includes at least one radio configuration parameter. And any two radio configuration parameter sets are different from each other in terms of at least one radio configuration parameter.

The terminal may pre-store the at least two radio configuration parameter sets, and the at least two radio configuration parameter sets are the same as the at least two radio configuration parameter sets acquired by the base ST in S210 and will not be elaborated herein for simplicity.

In S250, the terminal receives the first system information sent by the base ST during the first time period on the basis of the at least one first radio configuration parameter set in the at least two radio configuration parameter sets through the at least one first frequency-domain resource.

The terminal, after acquiring the at least two radio configuration parameter sets, may traverse the at least two radio configuration parameter sets to search for the first radio configuration parameter set configured to acquire the first system information.

Optionally, the operation that the terminal receives the first system information sent by the base ST during the first time period on the basis of the at least one first radio configuration parameter set in the at least two radio configuration parameter sets through the at least one first frequency-domain resource includes the following operations.

The terminal determines the at least one first frequency-domain resource configured for receiving the first system information.

The terminal determines a first group of the radio configuration parameter sets, corresponding to a frequency corresponding to each of the at least one first frequency-domain resource, of the at least two radio configuration parameter sets according to the frequency corresponding to each of the at least one first frequency-domain resource. The first group includes the at least one first radio configuration parameter set.

And the terminal receives from the base ST the first system information during the first time period via the at least one first frequency-domain resource based on the at least one first radio configuration parameter set.

Specifically, the terminal may search for the first system information on a supported frequency band. For example, the terminal may sequentially receive the first system information according to an existing frequency grid node. A frequency band where the terminal receives the first system information during the first time period is determined as the first frequency-domain resource. It is to be understood that a specific process that the terminal searches for the first frequency-domain resource is similar to a specific process in the conventional art that the terminal searches for a time-frequency resource configured to receive information and will not be elaborated herein for simplicity.

Then, the terminal determines a group (recorded as a first group for convenient understanding and description) of the corresponding radio configuration parameter set on the basis of the frequency band where the first system information is received. The first group includes at least one radio configuration parameter set, and the first group includes the at least one first radio configuration parameter set. The terminal may traverse each radio configuration parameter set in the first group and finally determine the at least one first radio configuration parameter set configured to receive the first system information.

It is to be understood that determination of the first radio configuration parameter set by the terminal according to the first time-frequency resource is only one optional implementation for determination of the first radio configuration parameter set in the disclosure and should not form any limit to the disclosure. The first radio resource configuration parameter may also be unrelated to the first frequency-domain resource. There are no special limits made in the disclosure.

It should also be understood that magnitudes of sequence numbers of each process illustrated in FIG. 2 are not intended to represent an execution sequence and the execution sequence of each process should be determined by their functions and internal logic and should not form any limit to an implementation process of the embodiment of the disclosure. For example, S240 may be executed after S230, may also be executed before S230 and may even be executed before S210. There are no special limits made in the disclosure.

In such a manner, according to the method for transmitting system information of the embodiment of the disclosure, the at least two radio configuration parameter sets configured to transmit system information are acquired, so that radio resource configuration flexibility may be improved. Moreover, the terminal acquires the at least two radio configuration parameter sets, and then the terminal determines the first radio configuration parameter set configured to transmit the first system information, so that the terminal may rapidly and accurately determine the first radio configuration parameter set and further accurately acquire the first system information.

It is to be noted that system information may include Basic System Information (BSI) and extended system information.

Wherein, the BSI may also be called an MIB and the extended system information may also be called a SIB. The extended system information may include information of a common or shared channel, a parameter about cell reselection or the like, which is not limited in the disclosure.

The first system information listed above may be an MIB and may also be the MIB and a SIB. That is, the base ST may send the MIB during the first time period on the basis of the first radio configuration parameter set through the first frequency-domain resource, and the base ST may also send the MIB and the SIB during the first time period on the basis of the first radio configuration parameter set through the first frequency-domain resource. There are no special limits made in the disclosure.

Hereinafter, there is made such a hypothesis that the first system information is the MIB and the base ST may also send the SIB (recorded as second system information for convenient distinction and understanding) through another time-frequency resource.

Optionally, the first system information includes first indication information, and the first indication information indicates at least one of a time-frequency resource or radio configuration parameter set used by the base ST for sending second system information, wherein the first system information includes an MIB, and the second system information includes at least one SIB.

Specifically, the terminal, after receiving the first system information during the first time period on the basis of the first radio configuration parameter set, may determine the time-frequency resource, or radio configuration parameter set or time-frequency resource and radio configuration parameter set used by the base ST for sending the second system information according to the first indication information in the first system information. For example, the first indication information may indicate that the resource used by the base ST for sending the second system information is a Physical Downlink Shared Channel (PDSCH).

The terminal may traverse the at least two radio configuration parameter sets on the time-frequency resource according to the time-frequency resource indicated by the first indication information to determine a second radio configuration parameter set configured to receive the second system information. The terminal may also receive on the time-frequency resource on the basis of another radio configuration parameter set according to the time-frequency resource indicated by the first indication information to determine a radio configuration parameter set configured to receive the second system information. That is, a radio configuration parameter set on the basis of which the base ST sends the second system information may be any one or more of the at least two radio configuration parameter sets and may also be outside a range of the at least two radio configuration parameter sets, and the second system information is sent through another radio configuration parameter set.

The terminal may also search for a frequency band configured to receive the second system information in the frequency band supported by the terminal on the basis of the radio configuration parameter set according to the radio configuration parameter set indicated by the first indication information to further determine the time-frequency resource configured to receive the second system information. The terminal may also directly receive the second system information according to the time-frequency resource and radio configuration parameter set indicated by the first indication information.

It is to be understood that the base ST may simultaneously send multiple pieces of second system information, at least one of a time-frequency resource or radio configuration parameter set corresponding to each piece of second system information may be indicated by indication information in the first system information and each piece of indication information indicates the time-frequency resource and/or radio configuration parameter set corresponding to the corresponding second system information.

Optionally, the second system information may be multiple pieces of system sub-information, the first indication information indicates at least one of a time-frequency resource or radio configuration parameter set for first system sub-information in the multiple pieces of system sub-information and the first system sub-information indicates indication information of at least one of a time-frequency resource or radio configuration parameter set for second system sub-information in the multiple pieces of system sub-information.

That is, when the second system information includes more than one piece of system sub-information, the time-frequency resource and/or radio configuration parameter set used for sending the next sub-information may be contained in the previous sub-information according to a time sequence for sending of the sub-information, wherein the indication information of the time-frequency resource and/or radio configuration parameter set for the first sent system sub-information (i.e., the first system sub-information) is contained in the first system information.

In other words, when the second system information includes multiple pieces of system sub-information, the time-frequency resource and/or radio configuration parameter set used by the base ST for sending each piece of system sub-information may be sequentially indicated in a cascaded indication manner.

It is to be understood that a specific method by which the terminal receives each system sub-information according to the time-frequency resource and/or the radio configuration parameter set is similar to a specific method, described above, for receiving the first system information according to the first time-frequency resource and/or the first radio configuration parameter set and will not be elaborated herein for simplicity.

In such a manner, according to the method for transmitting system information of the embodiment of the disclosure, the indication information configured to indicate the time-frequency resource and/or radio configuration parameter set used by the base ST for sending the second system information is contained in the first system information, so that the resource configuration flexibility is ensured, and meanwhile, the terminal may rapidly and accurately receive the second system information conveniently.

It is to be noted that the method, described above, by which the first system information and the second system information are transmitted between the base ST and the terminal may be applied to the scenario where cell reselection is required when the terminal located in the first cell selects the network after being turned on or the terminal located in the first cell is switched from the idle state to the connected state. The disclosure is not limited. For example, when the terminal is located on an edge of a cell and is required to perform cell handover, system information of an adjacent cell may be required. A specific process that the terminal acquires system information of the adjacent cell may also be implemented through the disclosure.

Optionally, the method 200 further includes that:

the base ST sends second indication information to the terminal, the second indication information indicating at least one of a time-frequency resource or radio configuration parameter set used by the terminal for receiving third system information, the third system information being system information for a second cell and the second cell being adjacent to the first cell.

Specifically, the base ST may send an adjacent cell list, a cell reorientation message, a cell handover message or the like to the terminal according to a measurement report made by the terminal, so that the terminal located on an edge of the first cell may perform cell handover and access the second cell. The second indication information may be born by signaling such as the adjacent cell list, the cell reorientation message or the cell handover message, so that the terminal, after receiving the signaling, may directly acquire the system information (i.e., the third system information) of the second cell according to the time-frequency resource and/or radio configuration parameter set indicated in the second indication information and used for receiving the third system information to complete cell reorientation or cell handover.

It is to be understood that a specific method by which the terminal receives the third system information on the basis of the time-frequency resource and/or radio configuration parameter set indicated by the second indication information is similar to a specific method, described above, for receiving the first system information according to the first time-frequency resource and/or the first radio configuration parameter set and will not be elaborated herein for simplicity.

It should also be understood that the third system information may be system information more detailed than the first system information described above and the difference is that the first system information is system information of the first cell and the third system information is system information of a third cell. The third system information may include an MIB and may also include the MIB and a SIB. When the third system information include the MIB, the third system information may also include indication information configured to indicate at least one of a time-frequency resource or radio configuration parameter set used by the terminal for receiving fourth system information (for example, SIB of the second cell). It is to be understood that a specific method for containing the indication information in the third system information and a content thereof are similar to a specific method for containing the first indication information in the first system information and content thereof described above and will not be elaborated herein for simplicity.

It is to be understood that containing of the second indication information in the adjacent cell list, the cell reorientation message or the cell handover message, listed above, is only one optional implementation of sending of the second indication information by the base ST and should not form any limit to the disclosure and the base ST may also bear the second indication information through another message or signaling. There are no special limits made in the disclosure.

The method, described above, by which the base ST sends the second indication information to the terminal to enable the terminal to receive the third system information according to the time-frequency resource and/or radio configuration parameter set indicated by the second indication information is implemented on the basis of the condition of time synchronism of the first cell and the second cell. Under the condition of time asynchronism between the first cell and the second cell, the time-frequency resource is a time-frequency resource synchronized with the second cell and its time-frequency position relative to the first cell is required to be determined according to a timing offset. Therefore, the method 200 further includes the following operation.

The base ST sends third indication information to the terminal, the third indication information indicating an offset between a timing of the first cell and a timing of the second cell.

Therefore, the terminal may calculate the relative time-frequency position of the time-frequency resource in the first cell according to the time-frequency resource and/or radio configuration parameter set indicated by the second indication information and the timing offset indicated by the third indication information and further acquire the third system information.

It is to be understood that a specific method by which the base ST sends the third indication information may be the same as or different from a specific method for sending the second indication information and the base ST may contain the third indication information through the adjacent cell list, the cell reorientation message or the cell handover message and may also contain the third indication information through another message or signaling. The second indication information and the third indication information may be born in the same message and may also be born in two messages. There are no special limits made in the disclosure.

It is to be noted that the second indication information and the third indication information may be acquired by the base ST of the first cell from a base ST of the second cell, may also be sent to the base ST of the first cell by a third-party network element (for example, a Radio Network Controller (RNC) or may further be forwarded to the base ST of the first cell by forwarding equipment. There are no special limits made in the disclosure.

In such a manner, according to the method for transmitting system information of the embodiment of the disclosure, the time-frequency resource and/or radio configuration parameter set configured to receive the system information of the adjacent cell are/is contained in the signaling sent to the terminal by the base ST, and then the terminal may acquire the system information of the adjacent cell during cell reorientation or cell handover, so that the resource configuration flexibility is ensured, meanwhile, the terminal may rapidly and accurately receive the third system information and cell access efficiency of the terminal is improved.

The method for transmitting system information according to the embodiments of the disclosure has been described above in combination with FIG. 2 in detail. A base ST and terminal according to the embodiments of the disclosure will be described below in combination with FIG. 3 and FIG. 4 in detail.

Figure 3:
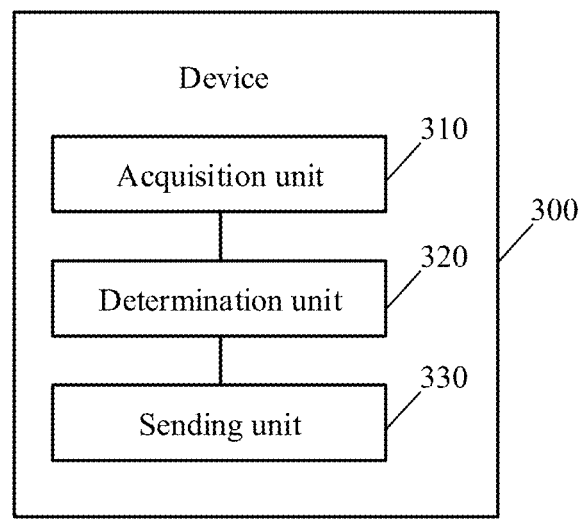
FIG. 3 is a schematic block diagram of a base ST according to an embodiment of the disclosure.

FIG. 3 is a schematic block diagram of a base ST 300 according to an embodiment of the disclosure. As illustrated in FIG. 3, the base ST 300 includes an acquisition unit 310, a determination unit 320 and a sending unit 330.

The acquisition unit 310 is configured to acquire at least two radio configuration parameter sets, each of the at least two radio configuration parameter sets includes at least one radio configuration parameter. And any two radio configuration parameter sets are different from each other in terms of at least one radio configuration parameter.

The determination unit 320 is configured to determine at least one of the at least two radio configuration parameter sets as at least one first radio configuration parameter set for transmitting first system information during a first time period.

The sending unit 330 is configured to send the first system information during the first time period via at least one first frequency-domain resource based on the at least one first radio configuration parameter set. The at least one first frequency-domain resource and the at least one first radio configuration parameter set have one-to-one correspondences during the first time period, and any two frequency-domain resources of the at least one first frequency-domain resource correspond to different frequencies.

The base ST 300 according to the embodiment of the disclosure may correspond to a base ST in the method for transmitting system information according to the embodiment of the disclosure and, moreover, each module in the base ST 300 and the other abovementioned operations and/or functions are adopted to implement the corresponding flows of the method in FIG. 2 respectively and will not be elaborated herein for simplicity.

In such a manner, according to the base ST of the embodiment of the disclosure, the at least two radio configuration parameter sets configured to transmit system information are acquired, so that radio resource configuration flexibility may be improved. Moreover, a terminal acquires the at least two radio configuration parameter sets, and then the terminal determines the first radio configuration parameter set configured to transmit the first system information, so that the terminal may rapidly and accurately determine the first radio configuration parameter set and further accurately acquire the first system information.

Figure 4:
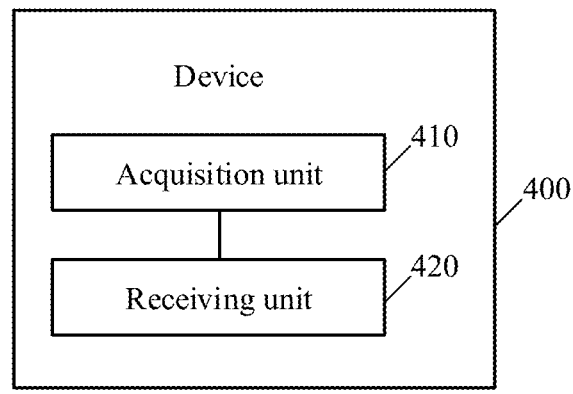
FIG. 4 is a schematic block diagram of a terminal according to an embodiment of the disclosure.

FIG. 4 is a schematic block diagram of a terminal 400 according to an embodiment of the disclosure. As illustrated in FIG. 4, the terminal 400 includes an acquisition unit 410 and a receiving unit 420.

Here, the acquisition unit 410 is configured to acquire at least two radio configuration parameter sets. Each of the at least two radio configuration parameter sets includes at least one radio configuration parameter. And any two radio configuration parameter sets are different from each other in terms of at least one radio configuration parameter.

The receiving unit 420 is configured to receive first system information sent by a base ST in a first time bucket on the basis of at least one first radio configuration parameter set in the at least two radio configuration parameter sets through at least one first frequency-domain resource. The at least one first frequency-domain resource and the at least one first radio configuration parameter set have one-to-one correspondences during the first time period, and any two frequency-domain resources of the at least one first frequency-domain resource correspond to different frequencies.

The terminal 400 according to the embodiment of the disclosure may correspond to a terminal in the method for transmitting system information according to the embodiment of the disclosure. Moreover, each module in the terminal 400 and the other abovementioned operations and/or functions are adopted to implement the corresponding flows of the method in FIG. 2 respectively and will not be elaborated herein for simplicity.

In such a manner, the terminal according to the embodiment of the disclosure acquires the at least two radio configuration parameter sets and, when receiving the first system information, determines the first radio configuration parameter set in the at least two radio configuration parameter sets, thereby accurately acquiring the first system information.

The base ST and terminal according to an embodiment of the disclosure have been described above in combination with FIG. 3 and FIG. 4 in detail. A base ST and terminal according to another embodiment of the disclosure will be described below in combination with FIG. 5 and FIG. 6 in detail.

Figure 5:
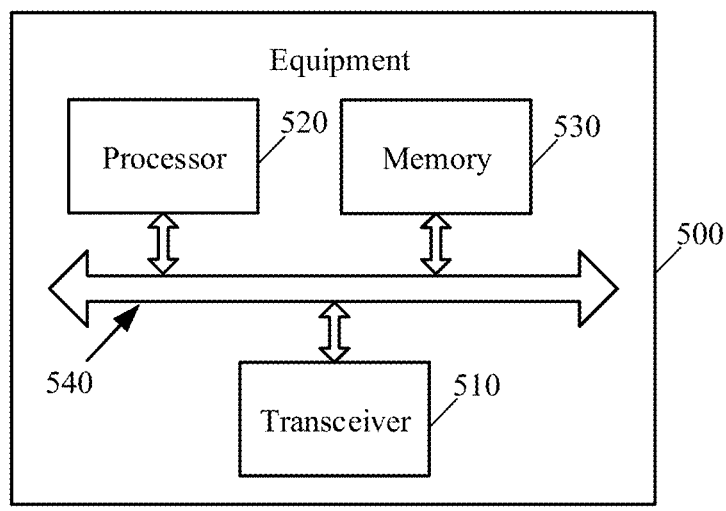
FIG. 5 is a schematic block diagram of a base ST according to another embodiment of the disclosure.

FIG. 5 is a schematic block diagram of a base ST 500 according to another embodiment of the disclosure. As illustrated in FIG. 5, the base ST 500 includes a transceiver 510, a processor 520, a memory 530 and a bus system 540, wherein the transceiver 510, the processor 520 and the memory 530 are connected through the bus system 540, the memory 530 is configured to store an instruction, and the processor 520 is configured to execute the instruction stored in the memory 530 to control the transceiver 510 to send and receive signals.

Here, the processor 520 is configured to acquire at least two radio configuration parameter sets, each of the at least two radio configuration parameter sets includes at least one radio configuration parameter. And any two radio configuration parameter sets are different from each other in terms of at least one radio configuration parameter.

The processor 520 is further configured to determine at least one of the at least two radio configuration parameter sets as at least one first radio configuration parameter set for transmitting first system information during a first time period.

The transceiver 510 is configured to send the first system information during the first time period via at least one first frequency-domain resource based on the at least one first radio configuration parameter set. The at least one first frequency-domain resource and the at least one first radio configuration parameter set have one-to-one correspondences during the first time period, and any two frequency-domain resources of the at least one first frequency-domain resource correspond to different frequencies.

It is to be understood that, in the embodiment of the disclosure, the processor 520 may be a Central Processing Unit (CPU) and the processor 520 may also be another universal processor, a Digital Signal Processor (DSP), an Application Specific Integrated Circuit (ASIC), a Field-Programmable Gate Array (FPGA) or another programmable logic device, discrete gate or transistor logic device and discrete hardware component and the like. The universal processor may be a microprocessor or the processor may also be any conventional processor and the like.

The memory 530 may include a Read-Only Memory (ROM) and a Random Access Memory (RAM) and provides an instruction and data for the processor 520. A part of the memory 530 may further include a nonvolatile RAM. For example, the memory 530 may further store information of an equipment type.

The bus system 540 includes a data bus, and may further include a power bus, a control bus, a state signal bus and the like. However, for clear description, various buses in the figure are marked as the bus system 540.

In an implementation process, each action of the method may be completed by an integrated logic circuit of hardware in the processor 520 or an instruction in a software form. The actions of the positioning method disclosed in combination with the embodiments of the disclosure may be directly embodied to be executed and completed by a hardware processor or executed and completed by a combination of hardware and software modules in the processor. The software module may be located in a mature storage medium in this field such as a RAM, a flash memory, a ROM, a Programmable ROM (PROM) or Electrically Erasable PROM (EEPROM) and a register. The storage medium is located in the memory 530, and the processor 520 reads information in the memory 530, and completes the actions of the method in combination with hardware. No more detailed descriptions will be made herein to avoid repetitions.

The base ST 500 according to the embodiment of the disclosure may correspond to a base ST in the method for transmitting system information according to the embodiment of the disclosure and, moreover, each module in the base ST 500 and the other abovementioned operations and/or functions are adopted to implement the corresponding flows of the method in FIG. 2 respectively and will not be elaborated herein for simplicity.

In such a manner, according to the base ST of the embodiment of the disclosure, the at least two radio configuration parameter sets configured to transmit system information are acquired, so that radio resource configuration flexibility may be improved. Moreover, a terminal acquires the at least two radio configuration parameter sets, and then the terminal determines the first radio configuration parameter set configured to transmit the first system information, so that the terminal may rapidly and accurately determine the first radio configuration parameter set and further accurately acquire the first system information.

Figure 6:
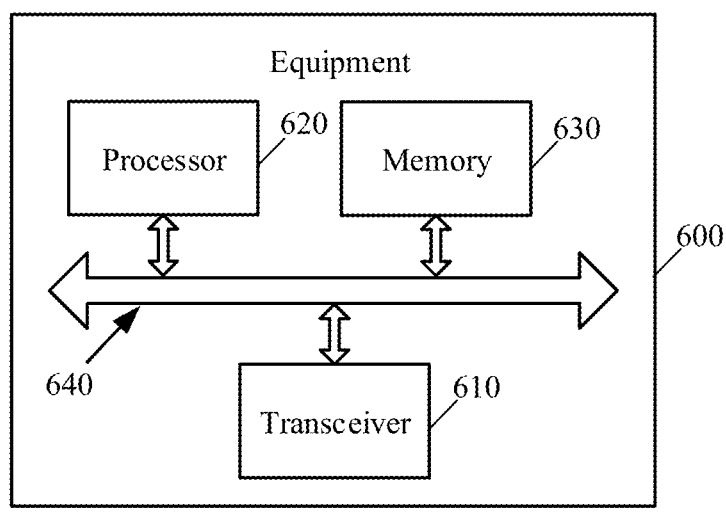
FIG. 6 is a schematic block diagram of a terminal according to another embodiment of the disclosure.

FIG. 6 is a schematic block diagram of a terminal 600 according to another embodiment of the disclosure. As illustrated in FIG. 6, the terminal 600 includes a transceiver 610, a processor 620, a memory 630 and a bus system 640, wherein the transceiver 610, the processor 620 and the memory 630 are connected through the bus system 640, the memory 630 is configured to store an instruction, and the processor 620 is configured to execute the instruction stored in the memory 630 to control the transceiver 610 to send and receive signals.

Here, the processor 620 is configured to acquire at least two radio configuration parameter sets, each of the at least two radio configuration parameter sets includes at least one radio configuration parameter. And any two radio configuration parameter sets are different from each other in terms of at least one radio configuration parameter.

The transceiver 610 is configured to receive first system information sent by a base ST in a first time bucket on the basis of at least one first radio configuration parameter set in the at least two radio configuration parameter sets through at least one first frequency-domain resource. The at least one first frequency-domain resource and the at least one first radio configuration parameter set have one-to-one correspondences during the first time period, and any two frequency-domain resources of the at least one first frequency-domain resource correspond to different frequencies.

The terminal 600 according to the embodiment of the disclosure may correspond to a terminal in the method for transmitting system information according to the embodiment of the disclosure and, moreover, each module in the terminal 600 and the other abovementioned operations and/ or functions are adopted to implement the corresponding flows of the method in FIG. 2 respectively and will not be elaborated herein for simplicity.

In such a manner, the terminal according to the embodiment of the disclosure acquires the at least two radio configuration parameter sets and, when receiving the first system information, determines the first radio configuration parameter set in the at least two radio configuration parameter sets, thereby accurately acquiring the first system information.

It is to be understood that term "and/or" in the disclosure is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Those of ordinary skill in the art may realize that the units and algorithm actions of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiment and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the disclosure may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a piece of computer equipment (which may be a personal computer, a server, network equipment or the like) to execute all or part of the actions of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

The invention claimed is:

1. A method for transmitting system information, comprising:
   acquiring, by a base Station (ST), at least two radio configuration parameter sets, each of the at least two radio configuration parameter sets comprising a subcarrier spacing, and a value of a subcarrier spacing of one of the at least two radio configuration parameter sets being different from a value of a subcarrier spacing of another of the at least two radio configuration parameter sets;
   determining, by the base ST, at least one of the at least two radio configuration parameter sets as at least one first radio configuration parameter set for transmitting first system information during a first time period; and
   sending, by the base ST, the first system information during the first time period via at least one first frequency-domain resource based on the at least one first radio configuration parameter set, and any two frequency-domain resources of the at least one first frequency-domain resource corresponding to different frequencies when the at least one first frequency-domain resource comprises two or more first frequency-domain resource.

2. The method of claim 1, further comprising:
   determining, by the base ST, at least one of the at least two radio configuration parameter sets as at least one second radio configuration parameter set for transmitting the first system information during a second time period; and
   sending, by the base ST, the first system information during the second time period via at least one second frequency-domain resource based on the at least one second radio configuration parameter set, and any two frequency-domain resources of the at least one second frequency-domain resource corresponding to different frequencies when the at least one second frequency-domain resource comprises two or more second frequency-domain resources.

3. The method of claim 1, wherein the determining, by the base ST, at least one of the at least two radio configuration parameter sets as at least one first radio configuration parameter set for transmitting first system information during a first time period comprises:
   determining, by the base ST, at least one of the at least two radio configuration parameter sets as at least one first radio configuration parameter set for transmitting first system information during a first time period according to at least one of: a carrier frequency band to which the frequency-domain resource corresponding to each of the at least one first radio configuration parameter set belongs and a carrier frequency-domain width, a geographical position and surrounding environment of the base ST, a transmission power at which the first system information is sent or an antenna form for sending of the first system information.

4. The method of claim 1, wherein the radio configuration parameter further comprises at least one of: an Orthogonal Frequency Division Multiplexing (OFDM) symbol length, a Cyclic Prefix (CP) length, a total number of OFDM symbols, a radio frame length and a subframe length.

5. The method of claim 1, wherein the first system information comprises first indication information, and the first indication information indicates at least one of a time-frequency resource or radio configuration parameter set used by the base ST for sending second system information, and wherein the first system information comprises a Master Information Block (MIB), and the second system information comprises at least one System Information Block (SIB).

6. The method of claim 1, wherein the base ST is a base ST for a first cell, a terminal is a terminal located in the first cell, and the method further comprises:
   sending, by the base ST, second indication information to the terminal, the second indication information indicating at least one of a time-frequency resource or radio configuration parameter set used by the terminal for receiving third system information, the third system information being system information for a second cell and the second cell being adjacent to the first cell.

7. The method of claim 6, further comprising:
   sending, by the base ST, third indication information to the terminal, the third indication information indicating an offset between a timing of the first cell and a timing of the second cell.

8. A method for transmitting system information, comprising:
   acquiring or pre-storing, by a terminal, at least two radio configuration parameter sets, each of the at least two radio configuration parameter sets comprising a subcarrier spacing, and a value of a subcarrier spacing of one of the at least two radio configuration parameter sets being different from a value of a subcarrier spacing of another of the at least two radio configuration parameter sets; and
   receiving, by the terminal, from a base station (ST) first system information during a first time period via at least one first frequency-domain resource based on at least one first radio configuration parameter set of the at least two radio configuration parameter sets, and any two frequency-domain resources of the at least one first frequency-domain resource corresponding to different frequencies when the at least one first frequency-domain resource comprises two or more first frequency-domain resources.

9. The method of claim 8, wherein receiving, by the terminal, from a ST first system information during a first time period via at least one first frequency-domain resource based on at least one first radio configuration parameter set of the at least two radio configuration sets comprises:
   determining, by the terminal, the at least one first frequency-domain resource configured for receiving the first system information;
   determining, by the terminal, a first group of the radio configuration parameter sets, corresponding to a frequency corresponding to each of the at least one first frequency-domain resource, of the at least two radio configuration parameter sets according to the frequency corresponding to each of the at least one first frequency-domain resource, the first group comprising the at least one first radio configuration parameter set; and
   receiving, by the terminal, from the base ST the first system information during the first time period via the at least one first frequency-domain resource based on the at least one first radio configuration parameter set.

10. The method of claim 8, further comprising:
    determining, by the terminal, at least one second radio configuration parameter set, for receiving the first system information during a second time period, of the at least two radio configuration parameter sets; and
    receiving, by the terminal, the first system information during the second time period via at least one second frequency-domain resource based on the at least one second radio configuration parameter set, and any two frequency-domain resources of the at least one second frequency-domain resource corresponding to different frequencies when the at least one second frequency-domain resource comprises two or more second frequency-domain resources.

11. The method of claim 10, wherein the at least one second frequency domain resource and the at least one second radio configuration parameter set have one-to-one correspondences during the second time period.

12. The method of claim 8, further comprising:
acquiring, by the terminal, first indication information from the first system information, the first indication information indicating at least one of a time-frequency resource or radio configuration parameter set used by the terminal for receiving second system information, wherein the first system information comprises a Master Information Block (MIB), and the second system information comprises at least one System Information Block (SIB).

13. The method of claim 8, wherein the terminal is a terminal located in a first cell, the base ST is a base ST for the first cell, and the method further comprises:
receiving, by the terminal, second indication information sent by the base ST, the second indication information indicating at least one of a time-frequency resource or radio configuration parameter set used by the terminal for receiving third system information, wherein the third system information is system information for a second cell and the second cell is adjacent to the first cell; and
receiving, by the terminal, the third system information according to the second indication information.

14. The method of claim 13, further comprising:
receiving, by the terminal, third indication information sent by the base ST, the third indication information indicating an offset between a timing of the first cell and a timing of the second cell, wherein
receiving, by the terminal, the third system information according to the second indication information comprises:
receiving, by the terminal, the third system information according to the second indication information and the third indication information.

15. The method of claim 8, wherein the at least one first frequency domain resource and the at least one first radio configuration parameter set have one-to-one correspondences during the first time period.

16. A base Station (ST), comprising:
a processor, configured to:
acquire at least two radio configuration parameter sets, each of the at least two radio configuration parameter sets comprising a subcarrier spacing, and a value of a subcarrier spacing of one of the at least two radio configuration parameter sets being different from a value of a subcarrier spacing of another of the at least two radio configuration parameter sets; and
determine at least one of the at least two radio configuration parameter sets as at least one first radio configuration parameter set for transmitting first system information during a first time period; and
a transceiver, configured to send the first system information during the first time period via at least one first frequency-domain resource based on the at least one first radio configuration parameter set, and any two frequency-domain resources of the at least one first frequency-domain resource corresponding to different frequencies when the at least one first frequency-domain resource comprises two or more first frequency-domain resources.

17. A terminal, comprising:
a processor, configured to acquire or pre-store at least two radio configuration parameter sets, each of the at least two radio configuration parameter sets comprising a subcarrier spacing, and a value of a subcarrier spacing of one of the at least two radio configuration parameter sets being different from a value of a subcarrier spacing of another of the at least two radio configuration parameter sets; and
a transceiver, configured to receive from a base station (ST) first system information during a first time period via at least one first frequency-domain resource based on at least one first radio configuration parameter set of the at least two radio configuration parameter sets, and any two frequency-domain resources of the at least one first frequency-domain resource corresponding to different frequencies when the at least one first frequency-domain resource comprises two or more first frequency-domain resources.

18. The terminal of claim 17, wherein
the processor is further configured to determine the at least one first frequency-domain resource configured for receiving the first system information and determine a first group of the radio configuration parameter sets, corresponding to a frequency corresponding to the at least one first frequency-domain resource, of the at least two radio configuration parameter sets according to the frequency corresponding to each of the at least one first frequency-domain resource, the first group comprising the at least one first radio configuration parameter set, and
the transceiver is specifically configured to receive from the base ST the first system information during the first time period via the at least one first frequency-domain resource based on the at least one first radio configuration parameter set.

19. The terminal of claim 17, wherein the processor is further configured to determine at least one second radio configuration parameter set for receiving the first system information during a second time period; and
the transceiver is further configured to receive the first system information during the second time period via at least one second frequency-domain resource based on the at least one second radio configuration parameter set, and any two frequency-domain resources of the at least one second frequency-domain resource corresponding to different frequencies when the at least one second frequency-domain resource comprises two or more second frequency-domain resources.

20. The terminal of claim 17, wherein the processor is further configured to acquire first indication information from the first system information, the first indication information indicating at least one of a time-frequency resource or radio configuration parameter set used by the terminal for receiving second system information, wherein the first system information comprises a Master Information Block (MIB), and the second system information comprises at least one System Information Block (SIB).

21. The terminal of claim 17, wherein the terminal is a terminal located in a first cell, the base ST is a base ST for the first cell, and
the transceiver is further configured to receive second indication information sent by the base ST, the second indication information indicating at least one of a time-frequency resource or radio configuration parameter set used by the terminal for receiving third system information, wherein the third system information is system information for a second cell and the second cell is adjacent to the first cell; and receive the third indication information according to the second indication information.

22. The terminal of claim 21, wherein the transceiver is further configured to receive third indication information sent by the base ST, the third indication information indicating an offset between a timing of the first cell and a timing of the second cell, and receive the third system information according to the second indication information and the third indication information.

* * * * *